(12) United States Patent
Kim et al.

(10) Patent No.: US 11,852,647 B2
(45) Date of Patent: Dec. 26, 2023

(54) METHOD FOR PREDICTING THE RUBBER REINFORCING EFFECT OF ORGANIC-INORGANIC COMPOSITE FOR RUBBER REINFORCEMENT

(71) Applicant: LG Chem, Ltd., Seoul (KR)

(72) Inventors: Woo Seok Kim, Daejeon (KR); Shin Hee Jun, Daejeon (KR); Ha Na Lee, Daejeon (KR); Kwon Il Choi, Daejeon (KR); Myounghwan Oh, Daejeon (KR)

(73) Assignee: LG Chem, Ltd.

( * ) Notice: Subject to any disclaimer, the term of this patent is extended or adjusted under 35 U.S.C. 154(b) by 1231 days.

(21) Appl. No.: 16/466,891

(22) PCT Filed: Jan. 5, 2018

(86) PCT No.: PCT/KR2018/000272
§ 371 (c)(1),
(2) Date: Jun. 5, 2019

(87) PCT Pub. No.: WO2018/182148
PCT Pub. Date: Oct. 4, 2018

(65) Prior Publication Data
US 2019/0310176 A1    Oct. 10, 2019

(30) Foreign Application Priority Data
Mar. 27, 2017    (KR) .................. 10-2017-0038553

(51) Int. Cl.
*G01N 5/02* (2006.01)
*C08K 3/34* (2006.01)
(Continued)

(52) U.S. Cl.
CPC ................. *G01N 5/02* (2013.01); *C08K 3/12* (2013.01); *C08K 3/34* (2013.01); *C08K 3/346* (2013.01);
(Continued)

(58) Field of Classification Search
CPC .............................. G01N 25/20; G01N 5/04
See application file for complete search history.

(56) References Cited

U.S. PATENT DOCUMENTS

| | | |
|---|---|---|
| 4,076,550 A | 2/1978 | Thurn et al. |
| 5,534,599 A | 7/1996 | Sandstrom et al. |

(Continued)

FOREIGN PATENT DOCUMENTS

| | | |
|---|---|---|
| CN | 1871123 A | 11/2006 |
| CN | 101014660 A | 8/2007 |

(Continued)

OTHER PUBLICATIONS

Database WPI, Week 200676, Thomson Scientific, London, GB; AN 2006-732961, XP002796563.
(Continued)

*Primary Examiner* — Mirellys Jagan
(74) *Attorney, Agent, or Firm* — Lerner David LLP

(57) ABSTRACT

The present disclosure relates to a method for predicting a rubber reinforcing effect of an organic-inorganic composite for rubber reinforcement. According to the present disclosure, a method for reliably predicting a rubber reinforcing effect of an organic-inorganic composite for rubber reinforcement by thermogravimetric analysis without mixing with a rubber composition is provided.

4 Claims, 3 Drawing Sheets

(51) Int. Cl.

| | | |
|---|---|---|
| *C08K 3/36* | (2006.01) | |
| *C08K 5/548* | (2006.01) | |
| *G01N 25/00* | (2006.01) | |
| *C08K 9/06* | (2006.01) | |
| *C08K 3/12* | (2006.01) | |
| *G01N 15/04* | (2006.01) | |
| *G01N 5/00* | (2006.01) | |
| *G01N 25/20* | (2006.01) | |
| *G01N 5/04* | (2006.01) | |
| *C08L 9/06* | (2006.01) | |

(52) U.S. Cl.
CPC ............... *C08K 3/36* (2013.01); *C08K 5/548* (2013.01); *C08K 9/06* (2013.01); *G01N 5/00* (2013.01); *G01N 5/04* (2013.01); *G01N 15/04* (2013.01); *G01N 25/00* (2013.01); *G01N 25/20* (2013.01); *C08K 2201/003* (2013.01); *C08L 9/06* (2013.01)

(56) References Cited

U.S. PATENT DOCUMENTS

| | | | |
|---|---|---|---|
| 2002/0173560 A1 | 11/2002 | Thielen | |
| 2003/0069332 A1 | 4/2003 | Agostini et al. | |
| 2005/0107548 A1 | 5/2005 | Grabau | |
| 2006/0009564 A1 | 1/2006 | Simonot et al. | |
| 2008/0033103 A1 | 2/2008 | Kameda et al. | |
| 2009/0163633 A1 | 6/2009 | Ko et al. | |
| 2010/0130671 A1 | 5/2010 | Tadaki et al. | |
| 2011/0288838 A1 | 11/2011 | Hamatani et al. | |
| 2012/0053264 A1 | 3/2012 | Nakayama et al. | |
| 2013/0273468 A1 | 10/2013 | Korchev et al. | |
| 2015/0038643 A1 | 2/2015 | Hishikawa et al. | |
| 2020/0131341 A1* | 4/2020 | Kim | C08K 3/34 |

FOREIGN PATENT DOCUMENTS

| | | | |
|---|---|---|---|
| CN | 101679571 A | 3/2010 | |
| CN | 102356120 A | 2/2012 | |
| CN | 103370377 A | 10/2013 | |
| EP | 1241204 A1 | 9/2002 | |
| IN | 101993570 A | 3/2011 | |
| JP | 2002293994 A | 10/2002 | |
| JP | 2006510766 A | 3/2006 | |
| JP | 2006096906 A | 4/2006 | |
| JP | 2006199899 A | 8/2006 | |
| JP | 4633471 B2 | 2/2011 | |
| JP | 2011190450 A | 9/2011 | |
| JP | 2013056984 A | 3/2013 | |
| JP | 2013213144 A | 10/2013 | |
| JP | 2017014373 A | 1/2017 | |
| KR | 960034288 A | 10/1996 | |
| KR | 20070052299 A | 5/2007 | |
| KR | 20090069015 A | 6/2009 | |
| KR | 20110111458 A | 10/2011 | |
| KR | 20140106223 A | 9/2014 | |

OTHER PUBLICATIONS

Database WPI, Week 201711, Thomson Scientific, London, GB; AN 2017-06718P, XP002796564.

Supplementary European Search Report including the Search Opinion for Application No. EP 18777622.4 dated Jan. 14, 2020, 7 pages.

Chinese Search Report for Application No. 201880007256.1 dated May 8, 2021, 3 pages.

E. M. Cichomski et al., "Influence of Physical and Chemical Polymer-filler Bonds on Wet Skid Resistance and Related Properties of Passenger Car Tire Treads", Jul. 3, 2012, pp. 1-12.

International Search Report for Application No. PCT/KR2018/000272 dated Oct. 30, 2018.

J.W.M. Noordermeer, et al., "Filler—Coupling Agent—Polymer Interactions and their Significance for Tire PerformanceMechanical Engineering on a Molecular Scale", TRC Symposium University of Twente Nov. 12, 2015, pp. 1-26.

Pongdhorn Sae-oui et al., "Roles of silane coupling agents on properties of silica-filled polychloroprene", European Polymer Journal, vol. 42, Available online Oct. 18, 2005, pp. 479-486.

* cited by examiner

[FIG. 1]
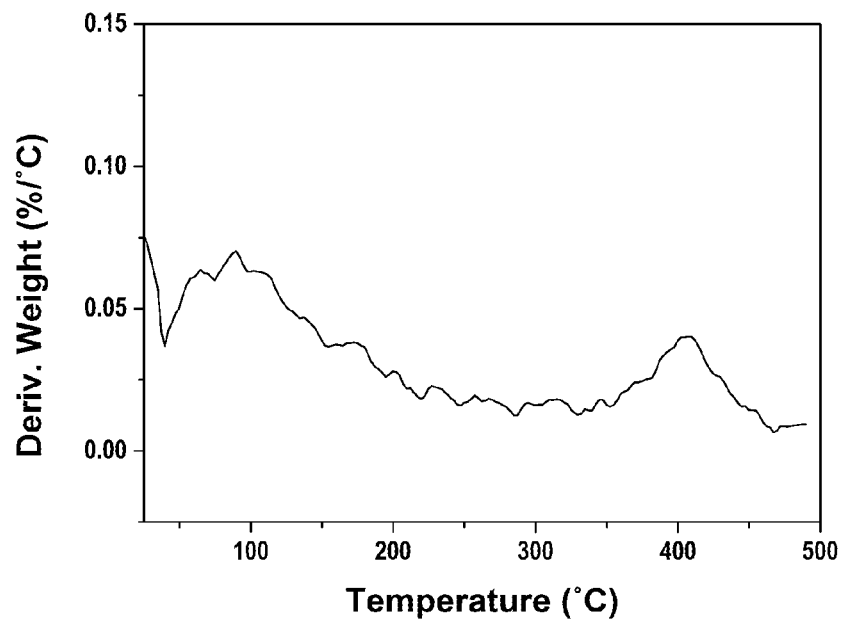
[FIG. 2]
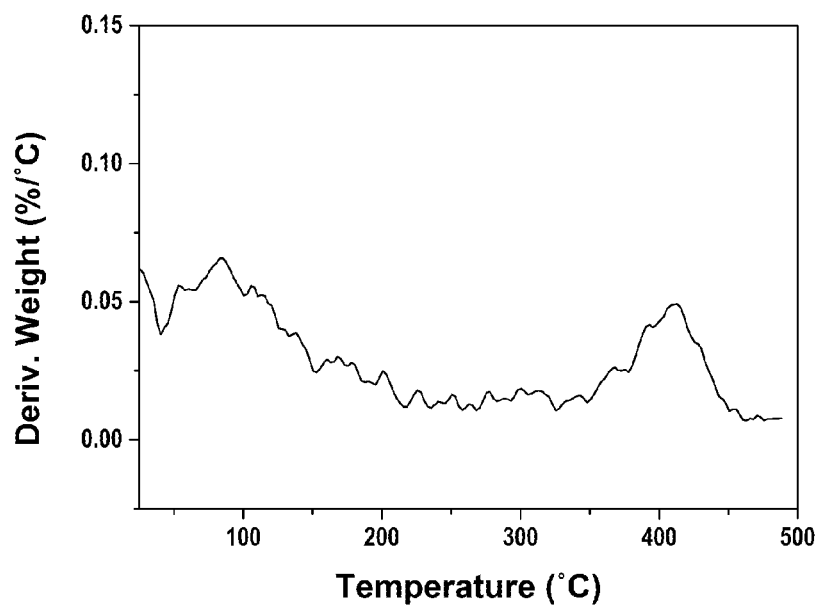

[FIG. 3]
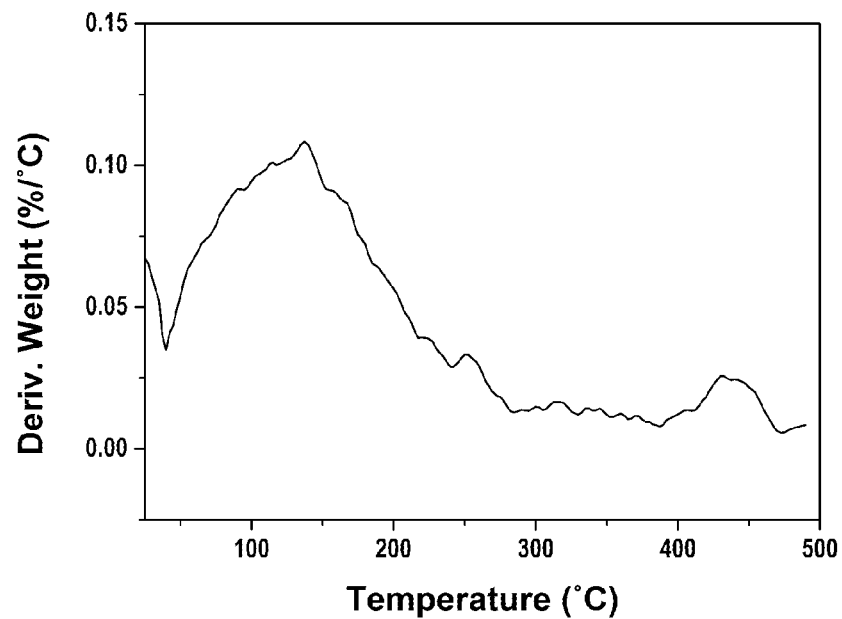
[FIG. 4]
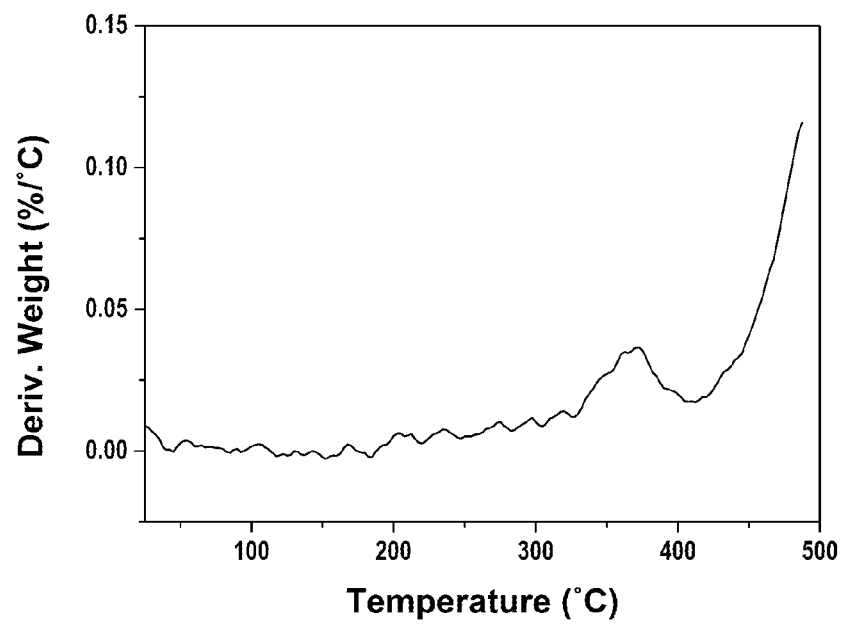

[FIG. 5]
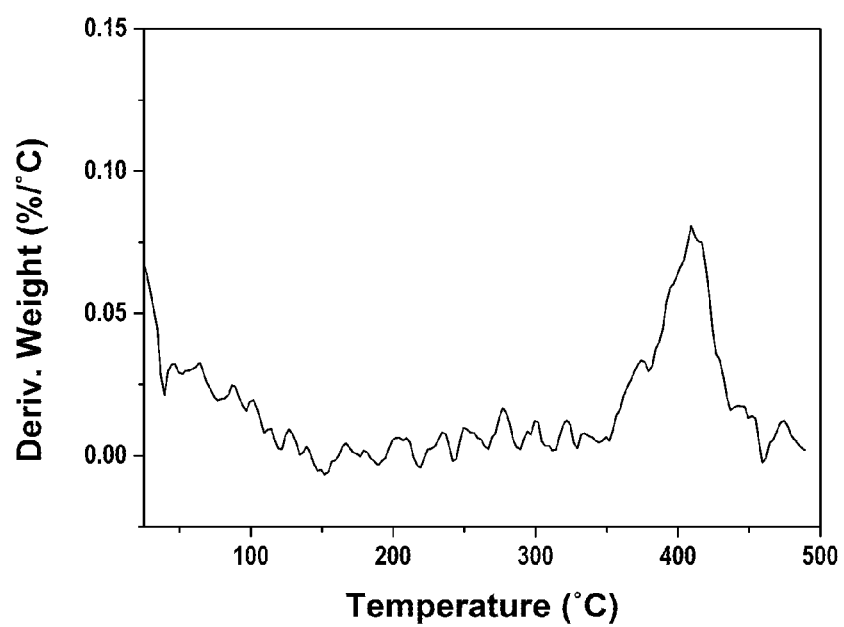

METHOD FOR PREDICTING THE RUBBER REINFORCING EFFECT OF ORGANIC-INORGANIC COMPOSITE FOR RUBBER REINFORCEMENT

CROSS-REFERENCE TO RELATED APPLICATION

The present application is a national phase entry under 35 U.S.C. § 371 of International Application No. PCT/KR2018/000272, filed on Jan. 5, 2018, which claims priority from Korean Patent Application No. 10-2017-0038553, filed on Mar. 27, 2017, the disclosures of which are incorporated herein by reference.

TECHNICAL FIELD

The present disclosure relates to a method for predicting a rubber reinforcing effect of an organic-inorganic composite for rubber reinforcement.

BACKGROUND OF ART

As concerns about global warming and environmental problems spread, environment-friendly concepts for increasing energy efficiency and reducing carbon emissions have attracted attention in various fields. These environment-friendly concepts are becoming evident in the tire industry by developing highly efficient eco-friendly tires and recycling waste tires.

Eco-friendly tires (or green tires) are tires that can reduce rolling resistance of rubber to achieve high efficiency and high fuel efficiency, resulting in a reduction in carbon emissions. Modified rubber materials and rubber reinforcing white additives (for example, precipitated silica) have been mainly used for manufacturing such eco-friendly tires.

Generally, silica materials have a problem that dispersibility in the rubber composition is low so that abrasion resistance is deteriorated. In order to compensate for this, it is known that a highly dispersed precipitated silica having specific conditions can be used together with a silane coupling agent to make a material for eco-friendly tires having good abrasion resistance.

On the other hand, there is also a high interest in additives such as the highly dispersed precipitated silica which may have good conflicting properties (mechanical strength such as rolling resistance and abrasion resistance). It is known that even when alumina, clay, kaolin, or the like is applied as the rubber reinforcing white additive, it can be used as an eco-friendly tire material by lowering rolling resistance. However, the rubber reinforcing white additive has a problem that the dispersibility decreases due to formation of a strong aggregate and the like, resulting in problems such as deterioration of mechanical strength.

In developing an inorganic material or a new material for rubber reinforcement, it is necessary to test and compare various physical properties by mixing the material with a rubber composition in order to confirm a rubber reinforcing effect of the materials. However, such a test procedure has a problem that a development period of the rubber reinforcing material is lengthened, making it difficult to develop a rubber reinforcing material adapted to a latest trend, and also causing an excessive cost.

DETAILED DESCRIPTION OF THE INVENTION

Technical Problem

The present disclosure is to provide a method for predicting a rubber reinforcing effect of an organic-inorganic composite for rubber reinforcement without mixing with a rubber composition.

Technical Solution

According to the present disclosure, a method for predicting a rubber reinforcing effect of an organic-inorganic composite is provided, wherein the method includes a step of performing thermogravimetric analysis (TGA) measuring weight change of an organic-inorganic composite as a function of temperature; and determining if the organic-inorganic composite is sufficient for rubber reinforcement based on the following Equation 1 being satisfied:

$$Da \geq 3.0 \qquad \text{[Equation 1]}$$

wherein, in Equation 1,
Da is an area under a derivative thermogravimetric curve over a temperature range of 300° C. to 500° C., wherein the derivative thermogravimetric curve is in units weight reduction percent of the organic-inorganic composite relative to temperature (%/° C.),
wherein the derivative thermogravimetric curve is obtained from thermogravimetric analysis (TGA) of the organic-inorganic composite in the measuring step.

Hereinafter, the method for predicting a rubber reinforcing effect of an organic-inorganic composite for a rubber reinforcement according to the exemplary embodiments of the present disclosure will be described in more detail.

In this specification, the terms are used merely to refer to specific embodiments, and are not intended to restrict the present disclosure unless that is explicitly expressed.

Singular expressions of the present disclosure may include plural expressions unless that is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

As a result of studies by the present inventors, it was confirmed that in the organic-inorganic composite for rubber reinforcement including an inorganic filler and a coupling agent bonded to at least a part of a surface of the inorganic filler, the degree of bonding formed between the inorganic filler and the coupling agent is closely related to the rubber reinforcing effect that the organic-inorganic composite can exhibit in the rubber composition.

According to the present disclosure, by evaluating the degree of bonding between the inorganic filler and the coupling agent through thermogravimetric analysis (TGA) of the organic-inorganic composite for rubber reinforcement, it is possible to indirectly and reliably predict the rubber reinforcing effect of the organic-inorganic composite for rubber reinforcement without mixing with a rubber composition.

An embodiment of the present disclosure provides a method for predicting rubber reinforcing effect of an organic-inorganic composite, including a step of performing thermogravimetric analysis (TGA) of an organic-inorganic composite for rubber reinforcement. Performing TGA may include measuring the weight change of the organic-inorganic composite as a function of temperature. A derivative thermogravametric curve, which is the change in weight to change in temperature (dm/dT), can be determined from these measurements. It is then determined if the organic-inorganic composite is sufficient for rubber reinforcement based on the following Equation 1 being satisfied:

$$Da \geq 3.0 \qquad \text{[Equation 1]}$$

wherein, in Equation 1,

Da is an area under a derivative thermogravimetric curve over a temperature range of 300° C. to 500° C., wherein the derivative thermogravimetric curve is in units weight reduction percent of the organic-inorganic composite relative to temperature (%/° C.), wherein the derivative thermogravimetric curve is obtained from thermogravimetric analysis (TGA) of the organic-inorganic composite in the measuring step. The area for Da may be determined from the derivative thermogravimetric curve, where an x-axis value [temperature (° C.)] is 300 to 500° C. and a y-axis value [reduction rate of weight (%/° C.)] is zero (0) or more.

In the method for predicting the rubber reinforcing effect of an organic-inorganic composite according to the present disclosure, the organic-inorganic composite for rubber reinforcement preferably includes an inorganic filler and a coupling agent bonded to at least a part of a surface of the inorganic filler.

In the present disclosure, the kind of the inorganic filler is not particularly limited, and conventional particles known to be applicable to rubber compositions (especially for tires) can be used. For example, the inorganic filler may be at least one particle selected from the group consisting of silica, crystalline aluminosilicate, amorphous aluminosilicate, kaolin, clay, and aluminum hydrate.

The particle diameter of the inorganic filler is not particularly limited, but it may be advantageous for the average particle diameter of all particles to be 10 to 100 nm to satisfy Equation 1.

The coupling agent may be a well-known binder for providing chemical or physical bonding between an elastomer contained in the rubber composition and the inorganic filler. The coupling agent is at least bifunctional, and includes a functional group binding to the inorganic filler and a functional group binding to the elastomer.

In the present disclosure, the kind of the coupling agent is not particularly limited, and conventional compounds known to be applicable to rubber compositions (particularly for tires) can be used. For example, the coupling agent may be a silane-based coupling agent.

As a non-limiting example, the coupling agent may be at least one compound selected from the group consisting of bis(3-triethoxysilylpropyl) tetrasulfide, bis(2-triethoxysilylethyl) tetrasulfide, bis(4-triethoxysilylbutyl) tetrasulfide, bis(3-trimethoxysilylpropyl) tetrasulfide, bis(2-trimethoxysilylethyl) tetrasulfide, bis(4-trimethoxysilylbutyl) tetrasulfide, bis(3-triethoxysilylpropyl) trisulfide, bis(2-triethoxysilylethyl) trisulfide, bis(4-triethoxysilylbutyl) trisulfide, bis(3-trimethoxysilylpropyl) trisulfide, bis(2-trimethoxysilylethyl) trisulfide, bis(4-trimethoxysilylbutyl) trisulfide, bis(3-triethoxysilylpropyl) disulfide, bis(2-triethoxysilylethyl) disulfide, bis(4-triethoxysilylbutyl) disulfide, bis(3-trimethoxysilylpropyl) disulfide, bis(2-trimethoxysilylethyl) disulfide, bis(4-trimethoxysilylbutyl) disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropyl benzothiazole tetrasulfide, 3-trimethoxysilylpropyl methacrylate monosulfide, and 3-trimethoxysilylpropyl methacrylate monosulfide.

Meanwhile, according to the present disclosure, when the thermogravimetric analysis (TGA) is performed on any organic-inorganic composite for rubber reinforcement having the above-mentioned composition, and the Da value of Equation 1 derived therefrom is 3.0 or more, it can be predicted that the composite can be preferably applied as a rubber reinforcing material to a rubber composition for tires.

For example, FIG. 1 is a graph showing a derivative thermogravimetric curve (hereinafter referred to as a "DTG curve") obtained by thermogravimetric analysis (TGA) of the organic-inorganic composite of Example 1 according to the present disclosure.

The DTG curve can be obtained by converting data measured by thermogravimetric analysis. The x-axis value is a temperature (° C.) and the y-axis value is a reduction rate of weight with temperature (%/° C.).

In the DTG curve of the organic-inorganic composite, a desorption temperature and a desorption amount can be determined by confirming the position and area of a peak appearing when intrinsic moisture contained in the inorganic filler and the coupling agent are desorbed from the inorganic filler.

For example, in FIG. 1, peaks appearing in a region where the x-axis value is 50 to 200° C. are shown while the intrinsic moisture contained in the inorganic filler is desorbed from the inorganic filler, and peaks appearing in a range of 300 to 500° C. are shown while the coupling agent is desorbed from the inorganic filler.

In Equation 1, Da is an area of a region where the x-axis value [temperature (° C.)] is 300 to 500° C. and the y-axis value [reduction rate of weight (%/° C.)] is zero (0) or more, in a derivative thermogravimetric curve (dm/dT) obtained by thermogravimetric analysis (TGA) of the organic-inorganic composite.

Preferably, when the Da value is 3.0 or more, 3.5 or more, 3.7 or more, 3.8 or more, 3.85 or more, 3.88 or more, 4.0 or more, or 4.2 or more, it may be applied as a rubber reinforcing material to a rubber composition for tires.

When the Da value is less than 3.0, physical properties (in particular, abrasion resistance of rubber molded products) required as the rubber reinforcing material for the organic-inorganic composite cannot be achieved, so it is difficult to apply the same to the rubber composition for tires.

As a non-limiting example, the organic-inorganic composite (A) for rubber reinforcement including aluminosilicate particles having a composition of the following Chemical Formula 1 and a silane-based coupling agent bonded to at least a part of a surface of aluminosilicate particles may advantageously satisfy the above Equation 1:

$$M_{x/n}[(AlO_2)_x(SiO_2)_y] \cdot m(H_2O) \qquad \text{[Chemical Formula 1]}$$

wherein, in Chemical Formula 1,

M is an element selected from the group consisting of Li, Na, K, Rb, Cs, Be, and Fr, or an ion thereof;

$x>0, y>0, n>0,$ and $m \geq 0$;

$1.0 \leq y/x \leq 10.0$; and $0.01 \leq x/n \leq 1.2.$

In the organic-inorganic composite (A), "amorphous" may refer to a full width at half maximum (FWHM) in a 2θ range of 20° to 37° in a data plot obtained by X-ray diffraction (XRD) of 3° to 8.5°.

Preferably, the full width at half maximum (FWHM) is 3° or more, 3.5° or more, 4.0° or more, 4.5° or more, 5.0° or more, 5.5° or more, or 6.0° or more. In addition, preferably, the FWHM is 8.5° or less, 8.0° or less, 7.5° or less, 7.0° or less.

The full width at half maximum (FWHM) is a numerical value of a peak width at half of the maximum peak intensity in the 2θ range of 20° to 37° obtained by X-ray diffraction of the aluminosilicate particles.

The unit of the full width at half maximum (FWHM) can be expressed in degrees)(°) which is the unit of 2θ. Compounds having high crystallinity may have a small FWHM value.

In the organic-inorganic composite (A), the amorphous aluminosilicate particles according to the embodiment of the present disclosure are characterized in that a maximum peak intensity ($I_{max}$) is in a 2θ range of 26° to 31° in a data plot obtained by X-ray diffraction (XRD).

Preferably, the maximum peak intensity ($I_{max}$) is in a 2θ range of 26° or more, 27° or more, or 28° or more. In addition, preferably, the maximum peak intensity (Imax) is in a 2θ range of 31° or less, 30.5° or less, or 30° or less.

For reference, amorphous silica shows $I_{max}$ in a 2θ range of 20° to 25° and amorphous alumina shows $I_{max}$ in a 2θ range of 30° to 40°.

In Chemical Formula 1, the aluminosilicate particles contain an alkali metal or an ion thereof as a metal element (M) or an ion thereof, and in particular, satisfy a composition of 1.0≤y/x≤10.0 and 0.01≤x/n≤1.2.

Specifically, in Chemical Formula 1, y/x is 1.0 or more, 1.15 or more, 1.3 or more, or 1.45 or more; and is 10.0 or less, 7.5 or less, 5.0 or less, 4.5 or less, 4.0 or less, 3.5 or less, 3.0 or less, 2.5 or less, or 2.0 or less, which may be advantageous for satisfying the above Equation 1.

Specifically, in Chemical Formula 1, x/n is 0.01 or more, 0.05 or more, 0.1 or more, 0.5 or more, 0.55 or more, 0.6 or more, 0.65 or more, 0.7 or more, 0.75 or more, or 0.8 or more; and is 1.2 or less, or 1.15 or less, which may be advantageous for satisfying the above Equation 1.

The amorphous aluminosilicate particles having a composition of Chemical Formula 1 may be prepared by a method including the steps of:

[i] adding silicon sources, aluminum sources, and water to a basic or alkaline solution (for example, a sodium hydroxide solution) and stirring to form an Al—O—Si structure of a monomer unit satisfying a specific metal atomic ratio;

[ii] curing the aluminosilicate monomer at a low temperature (for example, from room temperature to 90° C.) and atmospheric pressure for 3 to 24 hours to cause an Al—O—Si polymerization reaction;

[iii] washing and drying the polymerized aluminosilicate particles; and

[iv] crushing the dried aluminosilicate particles to control particle size distribution.

In addition, the organic-inorganic composite (A) may be prepared by preparing amorphous aluminosilicate particles having a composition represented by the Chemical Formula 1, a silane-based coupling agent, and an organic solvent having a boiling point of 150° C. or higher and which is not reactive therewith; heating the amorphous aluminosilicate particles and the organic solvent to 130 to 150° C. while mixing them; adding the silane-based coupling agent to the heated mixture and stirring for 10 to 60 minutes to form an organic-inorganic composite having the silane-based coupling agent bound to at least a part of a surface of the amorphous aluminosilicate particles; and washing and drying the organic-inorganic composite.

Advantageous Effects

According to the present disclosure, a method for indirectly predicting a rubber reinforcing effect of an organic-inorganic composite for rubber reinforcement by thermogravimetric analysis without mixing with a rubber composition is provided.

BRIEF DESCRIPTION OF THE DRAWINGS

FIG. 1 is a graph showing a derivative thermogravimetric curve obtained by thermogravimetric analysis (TGA) of the organic-inorganic composite of Example 1.

FIG. 2 is a graph showing a derivative thermogravimetric curve obtained by thermogravimetric analysis (TGA) of the organic-inorganic composite of Example 2.

FIG. 3 is a graph showing a derivative thermogravimetric curve obtained by thermogravimetric analysis (TGA) of the organic-inorganic composite of Example 3.

FIG. 4 is a graph showing a derivative thermogravimetric curve obtained by thermogravimetric analysis (TGA) of the organic-inorganic composite of Example 4.

FIG. 5 is a graph showing a derivative thermogravimetric curve obtained by thermogravimetric analysis (TGA) of the organic-inorganic composite of Example 5.

DETAILED DESCRIPTION OF THE EMBODIMENTS

Hereinafter, preferred examples are provided for better understanding. However, these examples are for illustrative purposes only, and the invention is not intended to be limited by these examples.

Synthesis Example 1

(Preparation of Amorphous Aluminosilicate Particles)

23 g of KOH (Daejung Chemicals & Metals) and 27 g of colloidal silica (Ludox HS 30 wt %, Sigma-Aldrich) were completely dissolved in 22 ml of distilled water (DW). 15 g of metakaolin ($Al_2Si_2O_7$, Aldrich) was added to the solution, followed by mixing at 600 rpm for 40 minutes using an overhead stirrer.

This was cured at a temperature of about 70° C. for 4 hours.

The cured solid product was added into distilled water at 90° C., stirred for 12 hours, and centrifuged to wash it to about pH 7.

The washed solid product was dried in an oven at 70° C. for 24 hours to finally obtain aluminosilicate particles (primary particle diameter of 30 nm).

Synthesis Example 2

(Preparation of Crystalline Aluminosilicate Particles)

12 g of NaOH (Daejung Chemicals & Metals) and 31 g of a $Na_2SiO_5$ solution (Aldrich) were completely dissolved in 22 ml of distilled water (DW). 15 g of metakaolin ($Al_2Si_2O_7$, Aldrich) was added to the solution, followed by mixing at 800 rpm for 40 minutes using an overhead stirrer.

This was cured at room temperature of about 25° C. for 24 hours.

The cured product was added into distilled water at 90° C., stirred for 12 hours, and centrifuged to wash it to about pH 7.

The washed solid product was dried in an oven at 70° C. for 24 hours to finally obtain aluminosilicate particles (primary particle diameter of 150 nm).

Experimental Example 1

(1) The average particle diameter and composition of the aluminosilicate particles according to Synthesis Examples 1 and 2 were confirmed using scanning electron microscopy (SEM) and energy dispersive X-ray spectroscopy (EDS).

As a result, it was confirmed that the aluminosilicate particles of Synthesis Example 1 had a composition of y/x=1.6 and x/n=1.12 in Chemical Formula 1. Also, it was confirmed that the aluminosilicate particles of Synthesis Example 2 had a composition of y/x=1.31 and x/n=0.91 in Chemical Formula 1.

(2) The nitrogen adsorption/desorption Brunauer-Emmett-Teller surface area ($S_{BET}$) and the external specific surface area ($S_{EXT}$) were measured for the particles according to Examples 1 and 2 using a specific surface area analyzer (BEL Japan Inc., BELSORP_MAX). Then, the volume of micropores ($V_{micro}$) having a pore size of less than 2 nm was calculated from the $S_{BET}$ by a t-plot method.

TABLE 1

| | Primary particle diameter (nm) | $S_{BET}$ ($m^2/g$) | $S_{EXT}$ ($m^2/g$) | $S_{EXT}/S_{BET}$ | $V_{micro}$ ($cm^3/g$) |
|---|---|---|---|---|---|
| Synthesis Example 1 | 30 | 104 | 89 | 0.86 | 0.007 |
| Synthesis Example 2 | 150 | 520 | 190 | 0.37 | 0.130 |

Experimental Example 2

X-ray diffraction analysis for the aluminosilicate particles according to Synthesis Examples 1 and 2 was carried out using an X-ray diffractometer (Bruker AXS D4-Endeavor XRD) under an applied voltage of 40 kV and an applied current of 40 mA. The results are shown in Table 2 below.

The measured range of 2θ was 10° to 90°, and it was scanned at an interval of 0.05°. Herein, a variable divergence slit of 6 mm was used as a slit, and a large PMMA holder (diameter=20 mm) was used to eliminate background noise due to the PMMA holder. Further, a full width at half maximum (FWHM) at a peak of about 29° which is the maximum peak in the 2θ range of 20° to 37° was calculated in the data plot obtained by X-ray diffraction (XRD).

TABLE 2

| | FWHM (°) | $I_{max}$ (°) | Crystal form |
|---|---|---|---|
| Synthesis Example 1 | 6.745 | 29.2 | amorphous |
| Synthesis Example 2 | — | — | FAU-type |

The aluminosilicate particles of Synthesis Example 2 had a FAU (faujasite) crystal structure, so the FWHM measurement was not performed.

Example 1

1.0 g of the amorphous aluminosilicate particles obtained in Synthesis Example 1 was added to 20 ml of mesitylene, and heated to 150° C. while stirring at 500 rpm. 0.08 g of bis(3-triethoxysilylpropyl)tetrasulfide (in 1.5 ml of mesitylene) was added thereto, and the mixture was stirred at 150° C. for 20 minutes.

After completion of the stirring, solids were washed four times by centrifugation using toluene, and dried in an oven at 105° C. for 24 hours to obtain an organic-inorganic composite.

Example 2

An organic-inorganic composite was obtained in the same manner as in Example 1, except that the amorphous aluminosilicate obtained in Synthesis Example 1 was pulverized to have a primary particle diameter of 20 nm or less.

Example 3

An organic-inorganic composite was obtained in the same manner as in Example 1, except that the crystalline aluminosilicate particles obtained in Synthesis Example 2 were used instead of the amorphous aluminosilicate particles obtained in Synthesis Example 1.

Example 4

An organic-inorganic composite was obtained in the same manner as in Example 1, except that kaolin clay (product name: Kaolin, manufactured by Sigma-Aldrich) was added instead of the amorphous aluminosilicate particles obtained in Synthesis Example 1.

Example 5

An organic-inorganic composite was obtained in the same manner as in Example 1, except that silica particles (product name: 7000GR, manufactured by Evonik) was added instead of the amorphous aluminosilicate particles obtained in Synthesis Example 1.

Experimental Example 3

The organic-inorganic composites according to Examples 1 to 5 were subjected to thermogravimetric analysis using a thermogravimetric analyzer (STA 449 F3 Jupiter®, NETZSCH) as follows.

The base value is set by performing three times thermogravimetric analysis at a heating rate of 5° C./min in the range of 30 to 500° C. under an argon gas atmosphere. 10 to 20 mg of the above-mentioned organic-inorganic composite in a powder form was loaded into a special crucible and subjected to thermogravimetric analysis under the same experimental conditions.

Derivative thermogravimetric curves converted from data obtained by the above analysis were obtained from the thermogravimetric analyzer, and are shown in FIG. 1 (Example 1), FIG. 2 (Example 2), FIG. 3 (Example 3), FIG. 4 (Example 4), and FIG. 5 (Example 5), respectively.

The peak position (° C.) at which the silane coupling agent is desorbed from the organic-inorganic composite is shown in Table 3 below.

Further, in the derivative thermogravimetric curve, an area (Da) of a region where the x-axis value is 300 to 500° C. and the y-axis value is zero (0) or more was obtained by the thermogravimetric analyzer, and is shown in Table 3 below.

However, in case of kaolin clay, weight loss due to hydroxyl groups on a particle surface occurs at 400° C. or higher. Therefore, the Da value for the organic-inorganic composite of Example 4 to which kaolin clay was applied was limited to a temperature range of 300 to 400° C.

TABLE 3

|  | Peak position (° C.) | Da |
| --- | --- | --- |
| Example 1 | 409.7 | 3.88 |
| Example 2 | 413.1 | 4.21 |
| Example 3 | 432.4 | 2.66 |
| Example 4 | 372.4 | 2.47 |
| Example 5 | 409.4 | 4.50 |

Referring to Table 3, the organic-inorganic composites of Examples 1, 2, and 5 had a Da value of 3.0 or more, and satisfied Equation 1.

On the other hand, the organic-inorganic composites of Examples 3 and 4 had a Da value of less than 3.0, and thus did not satisfy Equation 1.

Preparation Example 1

737.24 g of a diene elastomer mixture (SSBR 2550, LG Chemical) and 375.32 g of the organic-inorganic composite according to Example 1 as a reinforcing material were added to a closed mixer. After mixing them at 150° C. for 5 minutes, 78.66 g of other additives (antioxidant, emulsifier, vulcanization accelerator, wax, etc.) were added thereto and mixed for 90 seconds.

The resulting mixture was extruded in the form of a sheet having a thickness of 2 to 3 mm, and vulcanized at 160° C. to obtain a rubber molded product. At this time, the vulcanization time was controlled referring to data obtained by measuring the above mixture at 160° C. using a moving die rheometer (MDR).

Preparation Example 2

A rubber molded product was obtained in the same manner as in Preparation Example 1, except that the organic-inorganic composite according to Example 2 was added as a reinforcing material.

Preparation Example 3

A rubber molded product was obtained in the same manner as in Preparation Example 1, except that the organic-inorganic composite according to Example 3 was added as a reinforcing material.

Preparation Example 4

A rubber molded product was obtained in the same manner as in Preparation Example 1, except that the organic-inorganic composite according to Example 4 was added as a reinforcing material.

Preparation Example 5

A rubber molded product was obtained in the same manner as in Preparation Example 1, except that the organic-inorganic composite according to Example 5 was added as a reinforcing material.

Experimental Example 4

The relative volume loss index was measured according to DIN ISO 4649 using an abrasion tester (Bareiss GmbH) for the rubber molded products according to Preparation Examples 1 to 5.

The relative volume loss index was calculated by the following equation for the rubber molded products of Preparation Examples 1 to 4, after determining the rubber molded product of Preparation Example 5 including the organic-inorganic composite of a control example as a reference material.

The relative volume loss index={[(the relative volume loss of Preparation Example 5)−(the relative volume loss of the corresponding Preparation Example)]/[the relative volume loss of Preparation Example 5)×100]}+100

TABLE 4

|  | Relative volume loss index (%) |
| --- | --- |
| Preparation Example 1 | 86 |
| Preparation Example 2 | 89 |
| Preparation Example 3 | 37 |
| Preparation Example 4 | 24 |
| Preparation Example 5 | 100 |

Referring to Table 4, it was confirmed that the rubber molded products of Preparation Examples 1, 2, and 5 to which the organic-inorganic composite of Example 1, 2, or 5 was applied exhibited excellent abrasion resistance of twice or more as compared with the rubber molded products of Preparation Examples 3 and 4 to which the organic-inorganic composite of Example 3 or 4 was applied.

As a result, it was confirmed that the above Equation 1 according to the present disclosure reliably predicts the rubber reinforcing effect of the organic-inorganic composite for rubber reinforcement.

The invention claimed is:

1. A method for predicting a rubber reinforcing effect of an organic-inorganic composite, comprising:
    measuring weight change of an organic-inorganic composite as a function of temperature over a temperature range of 30° C. to 500° C. to perform thermogravimetric analysis (TGA); and
    determining if the organic-inorganic composite is sufficient for rubber reinforcement based on the following Equation 1 being satisfied:

$$Da \geq 3.0 \qquad \text{[Equation 1]}$$

wherein, in Equation 1,
    Da is an area under a derivative thermogravimetric curve over a temperature range of 300° C. to 500° C., wherein the derivative thermogravimetric curve is in units of weight reduction percent of the organic-inorganic composite relative to temperature (%/° C.), and
    wherein the derivative thermogravimetric curve is obtained from the thermogravimetric analysis (TGA) of the organic-inorganic composite.

2. The method for predicting a rubber reinforcing effect of the organic-inorganic composite of claim 1,
    wherein the organic-inorganic composite for rubber reinforcement comprises an inorganic filler and a coupling agent bonded to at least a part of a surface of the inorganic filler.

3. The method for predicting a rubber reinforcing effect of the organic-inorganic composite of claim 2, wherein the inorganic filler is at least one particle selected from the group consisting of silica, crystalline aluminosilicate, amorphous aluminosilicate, kaolin, clay, and aluminum hydrate.

4. The method for predicting a rubber reinforcing effect of the organic-inorganic composite of claim 2, wherein the coupling agent is at least one compound selected from the group consisting of bis(3-triethoxysilylpropyl) tetrasulfide, bis(2-triethoxy silylethyl) tetrasulfide, bis(4-triethoxysilylbutyl) tetrasulfide, bis(3-trimethoxysilylpropyl) tetrasulfide, bis(2-trimethoxy silylethyl) tetrasulfide, bis(4-trimethoxysilylbutyl) tetrasulfide, bis(3-triethoxysilylpropyl) trisulfide, bis(2-triethoxysilylethyl) trisulfide, bis(4-triethoxysilylbutyl) trisulfide, bis(3-trimethoxysilylpropyl) trisulfide, bis(2-trimethoxy silylethyl) trisulfide, bis(4-trimethoxysilylbutyl) trisulfide, bis(3-triethoxysilylpropyl) disulfide, bis(2-triethoxy silylethyl) disulfide, bis(4-triethoxysilylbutyl) disulfide, bis(3-trimethoxysilylpropyl) disulfide, bis(2-trimethoxy silylethyl) disulfide, bis(4-trimethoxysilylbutyl) disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropyl benzothiazole tetrasulfide, 3-trimethoxysilylpropyl methacrylate mono sulfide, and 3-trimethoxysilylpropyl methacrylate mono sulfide.

* * * * *